United States Patent
Khodabhai

Patent Number: 5,959,569
Date of Patent: Sep. 28, 1999

[54] METHOD AND APPARATUS FOR IN PATH TARGET DETERMINATION FOR AN AUTOMOTIVE VEHICLE USING A GYROSCOPIC DEVICE

[75] Inventor: Yashwant Khodabhai, Poway, Calif.

[73] Assignee: Eaton Vorad Technologies, L.L.C., San Diego, Calif.

[21] Appl. No.: 08/947,772

[22] Filed: Oct. 9, 1997

[51] Int. Cl.$^6$ ..................................... G01S 13/93
[52] U.S. Cl. ............................ 342/70; 701/300
[58] Field of Search ................ 342/70, 71, 72; 340/903; 701/300, 301, 302

[56] References Cited

U.S. PATENT DOCUMENTS

| | | | |
|---|---|---|---|
| 3,689,882 | 9/1972 | Dessailly | 340/903 |
| 4,414,548 | 11/1983 | Carpenter et al. | 342/117 |
| 4,703,429 | 10/1987 | Sakata | 364/426 |
| 5,314,037 | 5/1994 | Shaw et al. | 180/169 |
| 5,402,129 | 3/1995 | Gellner et al. | 342/70 |
| 5,467,283 | 11/1995 | Butsuen et al. | 364/461 |
| 5,529,138 | 6/1996 | Shaw et al. | 180/169 |
| 5,670,963 | 9/1997 | Kubota et al. | 342/70 |

FOREIGN PATENT DOCUMENTS

WO95/14939 6/1995 WIPO.
WO95/34830 12/1995 WIPO.

*Primary Examiner*—John B. Sotomayor
*Attorney, Agent, or Firm*—Jaquez & Associates

[57] ABSTRACT

The present invention concerns a method, an apparatus and an article of manufacture that satisfies the need for determining whether or not an obstacle vehicle is in the path of a host vehicle. Specifically, the present invention satisfies the above stated regardless of whether or not the host vehicle is moving in a straight path or along a curved path. Preferably, input data ("input") is collected from instruments mounted to a host vehicle. The input is used to calculate for the host vehicle the average turn rate, the radius of curvature of the path being traveled, the velocity, and a range from the host vehicle to a obstacle vehicle. Additionally, the input is used to determine the deviation of an obstacle from a 0° reference azimuth extending through the center of a radar beamating from a radar unit mounted to the host vehicle. An obstacle azimuth angle $\alpha_i$ is calculated and used to determine whether or not the obstacle is in the path of the host vehicle. After a determination is made as to whether or not the obstacle is in the path of the host vehicle, the results of that determination are sent to and displayed by sensors and displays which designate the results.

38 Claims, 8 Drawing Sheets

METHOD AND APPARATUS FOR IN PATH TARGET DETERMINATION FOR AN AUTOMOTIVE VEHICLE USING A GYROSCOPIC DEVICE

BACKGROUND OF THE INVENTION

1. Field of the Invention

The present invention relates to vehicular radar systems, and more particularly to an apparatus, method, and article of manufacture for a vehicle collision avoidance system which determines whether an obstacle lies in the path of a host vehicle.

2. Description of the Related Art

There is a continuing need to increase the density of vehicles traveling the world's roadways and simultaneously to improve the safety of highway vehicle operations by preventing highway vehicles from colliding with stationary and moving objects (such as roadside obstacles and other vehicles). One means for accomplishing these seemingly contradictory goals is to monitor the relative speed, direction of travel, and distance between a vehicle and any obstacle in its path, and to use such information to provide warnings of potential danger to the vehicle's driver. It is becoming increasingly more common for automotive engineers to consider the use of radar systems as a means to monitor such environmental conditions.

Vehicle borne radar systems which transmit and receive at three different frequencies on a time division basis, with two of the frequencies being used to determine range, and the third being combined with one of the first two to determine closing speed and likelihood of collision, are presently known. One such system is disclosed in U.S. Pat. No. 3,952,303 to Watanabe et al., which teaches an analog radar system processing front end.

Another example of an automotive radar system is described in U.S. Pat. No. 5,402,129, entitled Multi-Frequency Automotive Radar System, and assigned to the assignee of the present invention. In that system, a transmit signal and the reflected received signal are coupled to an RF mixer. The relevant output from the RF mixer is a signal that has a frequency equal to the difference between the transmit and receive frequencies. The frequency of the reflected received signal may be shifted from the frequency of the transmit signal upon its return due to the "Doppler" effect. Doppler effect occurs whenever a transmitted signal reflects off an obstacle that has a motion relative to a transceiver. The resulting frequency shift is referred to as a "Doppler shift".

A further example of an automotive radar system, which uses principally a digital approach, is described in U.S. Pat. No. 5,302,596, entitled Multi-Frequency, Multi-Target Vehicular Radar System Using Digital Signal Processing, and assigned to the assignee of the present invention. In that system, which includes a transmit section for generating two-channel transmit frequency, an antenna both transmits the transmit signal and receives a reflected receive signal. A diode mixer generates a difference signal having a frequency equal to the transmit frequency minus the received frequency. A signal switch in a front end electronics section time multiplexes and samples the channel one and channel two signals, following which the samples are coupled to a two-channel analog-to-digital converter. A digital electronic section receives the digital information and performs a Fast Fourier Transform on each channel of digital data to determine relative speed and range of an obstacle based upon the frequency and the difference in phase of the two channels. The digital electronic section also receives information regarding the status of vehicle operation and/or controls to determine the degree of danger presented by an identified obstacle.

In vehicular collision avoidance radar systems, it is necessary to know whether or not an obstacle is in the host vehicle's path of travel. This is typically done by determining whether the obstacle is off-boresight, and if so, the direction and amount of the angular error (angular deviation from boresight). It is also desirable or necessary to know the distance or range of the obstacle. To provide for continuous tracking, a number of systems have been proposed including those which transmit a signal and then combine a multiplicity of diversely received replicas of the signal. Examples of such systems are provided by U.S. Pat. No. 4,060,809 of Baghdady, U.S. Pat. No. 4,975,710 of Baghdady, U.S. Pat. No. 5,084,709 of Baghdady, and U.S. Pat. No. 5,128,969 of Baghdady. However, such systems have proven to have shortcomings which make them undesirable or impractical when employed for use in vehicular collision avoidance radar systems. Such systems are limited in their ability to provide data when the host vehicle with the radar system is on a curved road, since the mere knowledge of the angular error is insufficient to allow the collision avoidance radar system to predict the path of the host vehicle with respect to the location of the obstacle. Accordingly, there is a need for a system that can so predict the path of the host vehicle with respect to obstacles identified by the system.

SUMMARY OF THE INVENTION

Broadly, the present invention concerns a method, an apparatus, and an article of manufacture used to determine whether or not an obstacle is within the path of a host vehicle. The invention provides a system which uses the digitized output from a device that measures vehicle turn rate in order to obtain radius of turn information. This information is used together with information provided by a radar system to warn of an impending collision and/or for cruise control functions. The present invention takes into account whether the host vehicle is moving in a straight path or along a curved path.

In one embodiment, the present invention is implemented as a method to determine whether an obstacle is in the host vehicle's path of travel. This determination is based on output data from one or more collection devices, such as a radar system, a rate of turn indicator, and other instruments mounted to the host vehicle, such as a speedometer or tachometer. Initially, the outputs from the collection devices are used to determine the host vehicle's velocity, average turn rate, the radius of curvature of the path being traveled, the relative velocity and range of any detected obstacles, and an obstacle azimuth angle, i.e., the deviation of an obstacle from a zero-degree (0°) reference azimuth co-incident with the longitudinal axis of the host, which is preferably the boresight of the radar systems. The obstacle azimuth angle is combined with the rate of turn information to determine whether or not the obstacle is in the path of the host vehicle.

In another embodiment, the invention is an apparatus to determine whether the obstacle is in the host vehicle's path. The apparatus receives input from a radar unit and a sensing device, such as a gyroscope, and includes a processor, digital storage, and a display. In its preferred embodiment, a radar unit such as that described in U.S. Pat. No. 5,302,956 or U.S. Pat. No. 5,402,129, both assigned to the assignee of the current invention, is used. Accordingly, these patents are incorporated herein by reference.

In conjunction with the radar unit, a gyroscope is preferably used to gather additional input data. The gyroscope may be of any design, but it is preferred that a low cost gyroscope be used. Alternatively, any device may be substituted for the gyroscope, such as a lateral accelerometer, or other turn rate sensing device, so long as the input returned to the system can be interpreted by the invention to determine the turn rate of the host vehicle. The radar unit and the gyroscope are coupled to circuitry which allows calculations involving the input to be performed. The calculations determine the rate of turn for the host vehicle and whether or not an obstacle is in the path of the host vehicle. The results of that determination are sent to and displayed by sensors and displays which designate the results. In the preferred embodiment, the circuitry includes a filter to eliminate aberrant input data being received from the gyroscope, a storage unit, and the circuitry necessary for implementation of the radar as disclosed in the referenced patents.

In still another embodiment, the invention is an article of manufacture comprising a data storage device tangibly embodying a program of machine-readable instructions executable by a digital data processing apparatus to perform method steps for determining whether the obstacle is in the host vehicle's path.

The invention provides its users with a number of distinct advantages. One advantage of the invention is that the invention determines whether an obstacle is in the reference vehicle's path, even if the host vehicle is traveling in a curved path. As such the system may be used as a component of a cruise control system to control the speed of a vehicle, even when the host vehicle is on a curved path. The system may also be used to control the distance between the host vehicle and another vehicle in the host vehicle's curved path.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE INVENTION

Broadly, the current invention uses an in-path obstacle determination (IOD) unit to determine whether or not an obstacle is in the path of a host vehicle. The invention may also be used in a cruise control device and in a variety of other applications.

Figure 1:
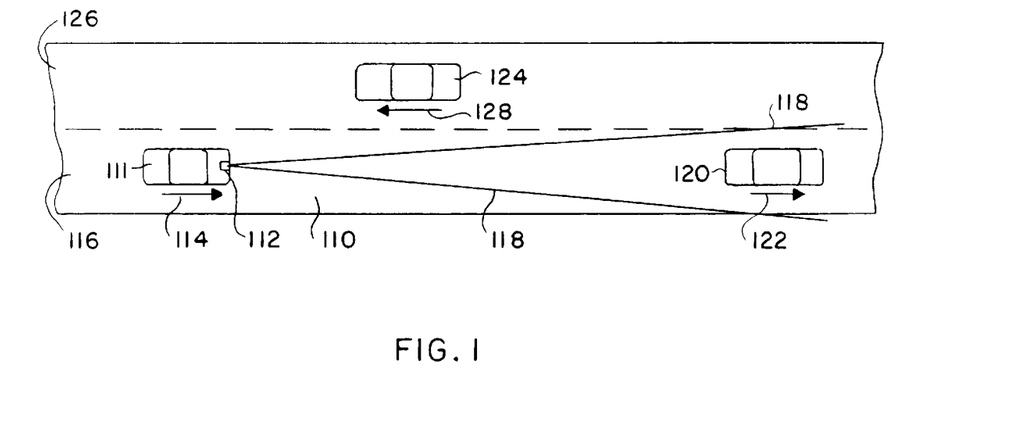
FIG. 1 is a plan view of a section of roadway showing a desired beam width emanating from a host vehicle for tracking an obstacle to the exclusion of other obstacles, in accordance with one embodiment of the present invention.

FIG. 1 shows a host vehicle 111 equipped with an IOD unit 112 traveling on a portion of a roadway 110. The host vehicle 111 travels in a direction shown by an arrow 114 in a lane 116 of the roadway 110. The IOD unit 112 of the vehicle 111 transmits a radar beam 118 preferably extending from the front end of the host vehicle 111 where the IOD unit 112 is mounted. Alternatively, the IOD unit may be mounted on the side or top of the host vehicle 111. The radar beam 118 is shown as encompassing an obstacle, such as vehicle 120. The vehicle 120 is moving in the same direction as the host vehicle 111, as represented by an arrow 122, in the lane 116. A third vehicle 124 is shown in a second lane 126 of the roadway 110, and traveling in an opposite direction from the host vehicle 111 and the vehicle 120, as represented by an arrow 128.

In one embodiment, the IOD unit 112 includes a sensing device and a radar unit through which, amongst other things, the turn rate and radius of curvature for the host vehicle 111 may be determined. The IOD unit 112 also preferably includes other devices, such as a velocimeter or speedometer, used to secure the information necessary to make an in-path obstacle determination.

Figure 2:
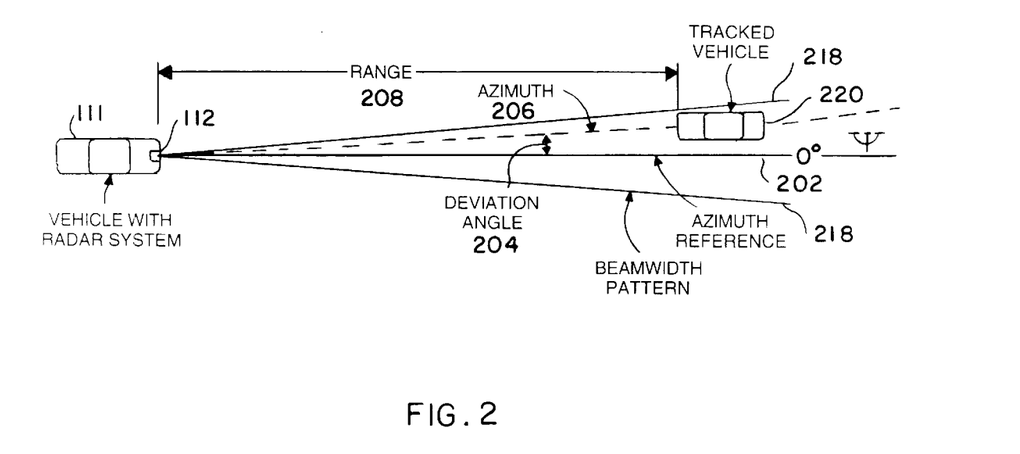
FIG. 2 is a plan view illustrating the manner in which the radar system determines off-boresight deviation and range of a target, in accordance with one embodiment of the present invention.

The preferred manner in which the IOD unit 112 in the host vehicle 111 uses the radar beam 118 to track obstacles is shown in one embodiment in FIG. 2. A radar beam 218 includes a zero-degree reference azimuth 202 extending along the center boresight of the radar beam 218. The IOD unit 112 of the host vehicle 111 is preferably capable of tracking obstacles both in front and to the side of its path of travel such as the vehicle 220. The radar beam 218 provides a continuous indication of the azimuth of the vehicle 220 with respect to the reference azimuth 202, as well as indications as to the range 208 and the relative motion of the vehicle 220 with respect to the host vehicle 111. The IOD unit 112 determines the deviation angle 204, or off-boresight condition, shown as an angle $\Psi$ in FIG. 2, of the vehicle 220 based on signals reflected by the vehicle 220 and received by the IOD unit 112.

In one embodiment, the radar beam 218 has an effective range of three hundred and fifty (350) feet in front of the host vehicle 111 and up to sixty (60) feet in width at the maximum range. In other embodiments, the range and breadth of radar beam 218 may be increased or decreased depending upon the radar unit employed. The IOD unit calculates the azimuth 206 of the vehicle 220 in terms of deviation angle 204. The sign of the deviation angle 204 determines on which side of the reference azimuth 202 the obstacle lies. The IOD unit also determines the range 208 of the vehicle 220 from the IOD unit 112 in conventional fashion such as by using dual frequency transmission and reception, a technique which would be well known to one skilled in the art.

Regardless of the embodiment, the IOD unit 112 may be used to warn, or assist in avoiding collisions with the rear-end, left side or right side of other vehicles on the road traveling in the same direction as the host vehicle and to illuminate obstacles beside the road, such as signposts, rocks, or pedestrians, or objects in adjoining lanes of travel. If desired, the IOD unit 112 may also detect obstacles travelling towards the host vehicle 111.

Figure 3A:
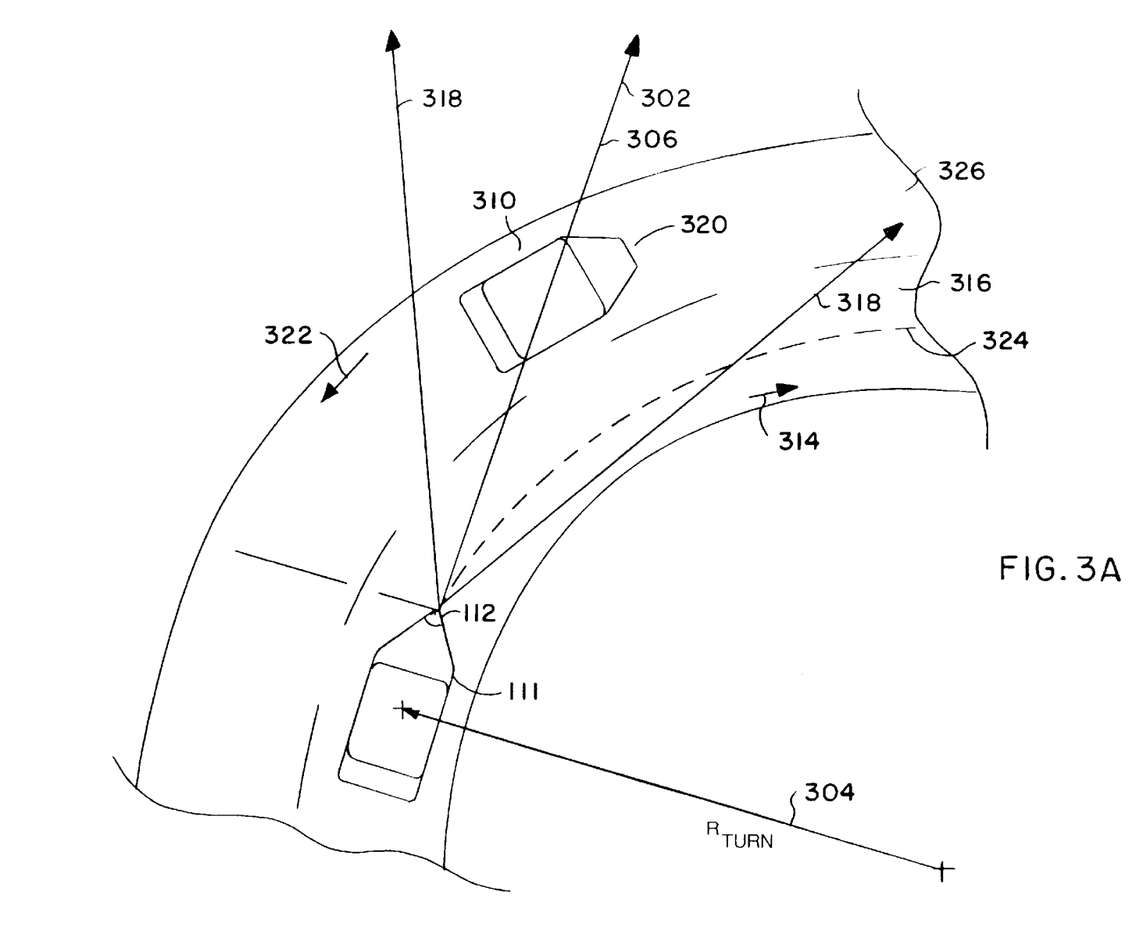
FIG. 3A is a plan view showing the manner in which the radar system determines off-boresight deviation when traveling along a curved path, in accordance with one embodiment of the present invention.

In one embodiment, the sensing unit is used to gather data to determine the host vehicle's 111 turn rate, radius of turn 304 and other information. Referring to FIG. 3, the host vehicle's rate of turn and radius of turn 304 are used along with the radar beam 318 data to determine whether or not an obstacle is in the path 324 of the host vehicle 111. As shown in FIG. 3, the host vehicle 111 is traveling along a curved path in a direction shown by an arrow 314 in a lane 316 of the roadway 310. The IOD unit 112 of the host vehicle 111 transmits a radar beam 318 extending from the front end of the host vehicle 111 where the IOD unit 112 is preferably mounted. The radar beam 318 is shown as encompassing a vehicle 320. The vehicle 320 is moving in a the same direction as the host vehicle 111, as represented by an arrow 322, located in the lane 326.

Figure 3B:
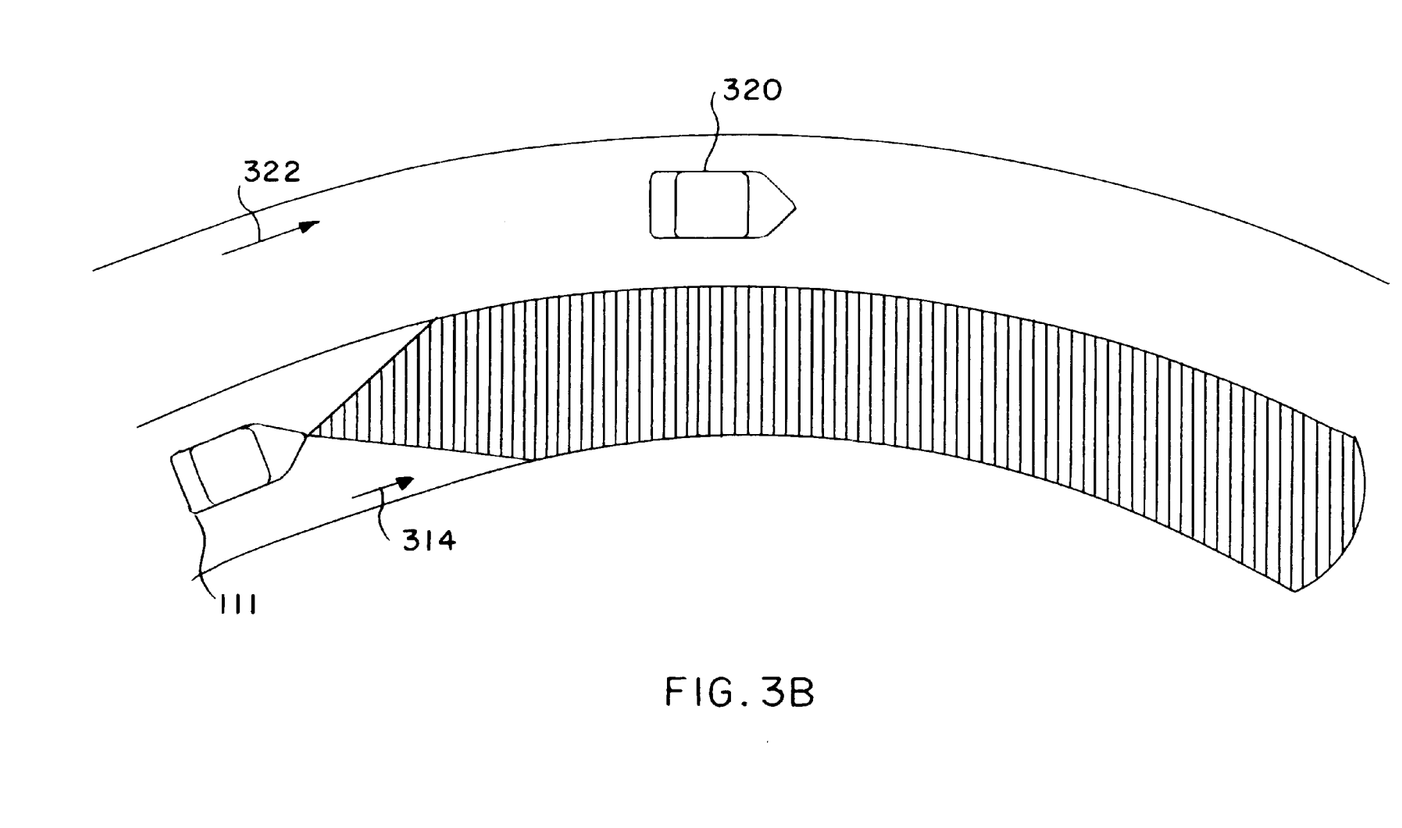
FIG. 3B is a plan view illustrating the area seen by the in-path obstacle determination unit in accordance with one embodiment of the present invention.

At first it would appear to the radar beam 318 that the vehicle 320 as "seen" by the radar is in the path of the referenced vehicle 111 because a deviation angle (not shown) (the angle between the reference azimuth 302 and the azimuth 306 as determined by the circuitry 500 of the present invention in the preferred embodiment) is zero. However, using the input from the sensing device of the IOD unit 112 to determine the average turn rate and the radius of turn 304 of the host vehicle, an obstacle azimuth angle can be computed by the present invention. The angle is used, as discussed below, to determine whether or not the vehicle 320 lies in the path of the host vehicle 111 when the host vehicle 111 is traveling along the curved path 324. If so, a warning and/or evasive action may be required. By using the additional input to determine average turn rate and the turn radius 15 304, the radar detection zone used to determine in-path obstacles, may be "shaped" to the curse of a roadway as shown in FIG. 3B.

OPERATION

HARDWARE COMPONENTS & INTERCONNECTIONS

A more detailed discussion of the apparatus of the invention follows. In one embodiment of the invention, a processor determines whether or not an obstacle is in the path of the host vehicle.

Figure 4:
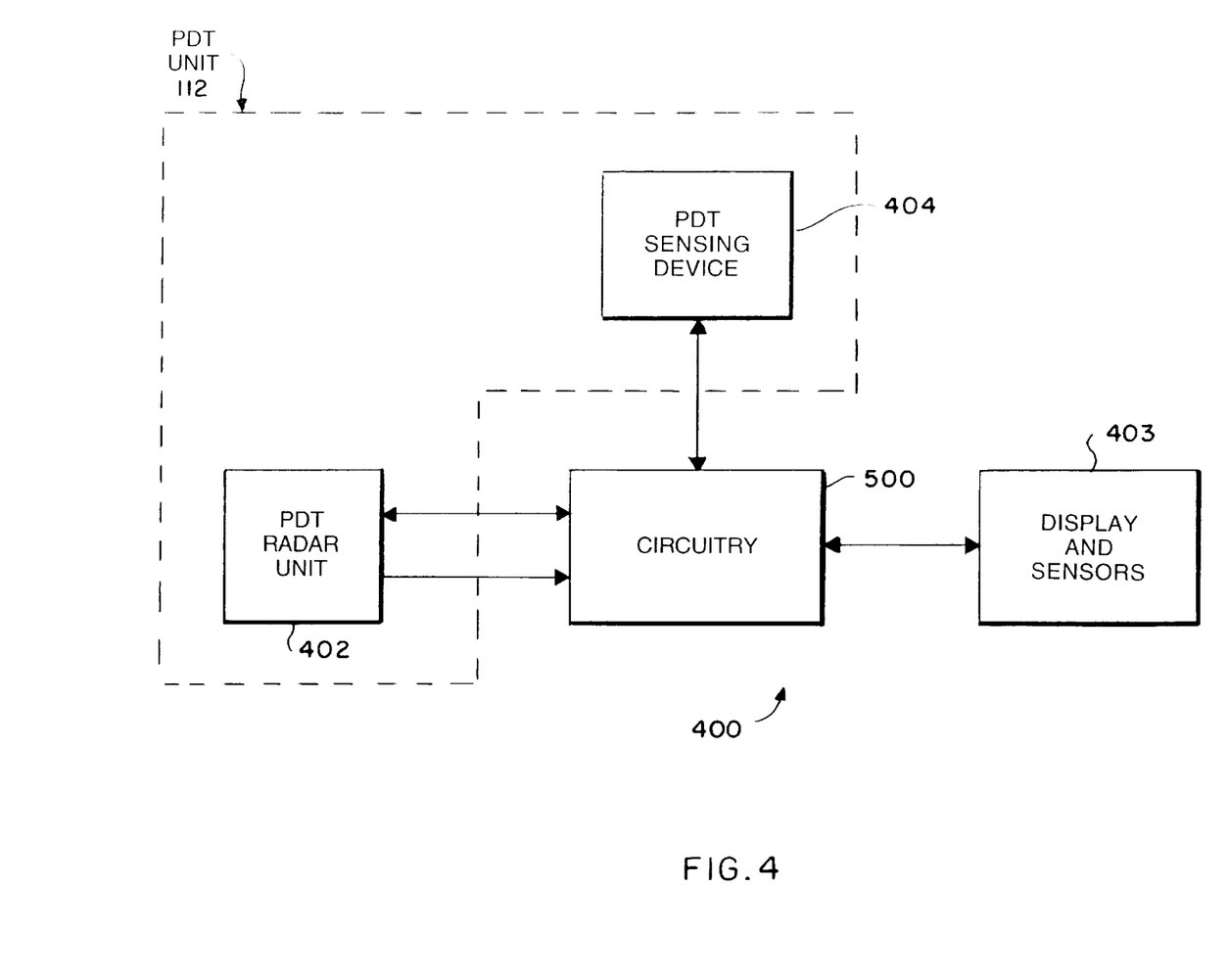
FIG. 4 is a simplified block diagram of the apparatus used in accordance with one embodiment of the present invention.

As shown in FIG. 4, the inventive system 400 includes the IOD unit 112 which preferably comprises a radar unit 402 and a sensing device 404, the present inventive circuitry 500, and display and control sensors 403.

In one embodiment of the invention, the radar unit 402 of the IOD unit 112 may be as shown in U.S. Pat. No. 5,402,129, incorporated by reference herein, and assigned to the assignee of the current invention. The radar unit 402 transmits a radar beam which can be adjusted, and which is selected to track targets positioned in front of the host vehicle. For example, the radar unit 402 used in the IOD unit 112 of the host vehicle 111, preferably transmits energy into the lane 316, shown in FIG. 3A in which the host vehicle 111 is traveling. At the same time, the radar beam is preferably wide enough to transmit into the adjacent lane 326 as the host vehicle 111 passes around curves in the roadway 310. However, the radar beam is not so wide as to include potential targets, such as vehicle 124 shown in FIG. 1, which are positioned quite close to, and at the side of, the host vehicle 111. Because the path of the vehicle 124 is such that the vehicle 124 will pass by the host vehicle 111 safely, the preferred embodiment of this present invention does not track the vehicle 124.

In another embodiment, the radar unit 402 is as shown in U.S. Pat. No. 5,302,596, incorporated by reference herein, and assigned to the assignee of the current invention. Although the radar unit is different than the radar unit discussed above, the capabilities for tracking an obstacle are substantially similar. Moreover, any tracking device, such as an ultra-sound range detection system could be used in place of the radar units discussed, so long as the resulting tracking capabilities were similar to that of the referenced radar units.

In another embodiment, the sensing device 404 of the IOD unit 112 may be a gyroscope. A low cost gyroscope is preferred. However, as is well known to those skilled in the art, gyroscopes, especially low cost gyroscopes, characteristically have a biased output. In other words, when the host vehicle 111 is traveling along a substantially straight path, the gyroscope will still have a nominal output. This output is not linear. Furthermore, low cost gyroscopes are prone to drift because of a number of effects, particularly ambient temperature changes and the quality of the gyroscope. The output of the gyroscope (especially low cost gyroscopes) is such that the drift can be equivalent to an angular rate of a few degrees per second over a temperature change of eighty degrees centigrade (80° C.). For example, a gyroscope tested in a thermal chamber over a temperature cycle of minus twenty degrees centigrade (−20° C.) to plus fifty degrees centigrade (+50° C.) may experience a change in bias equivalent to about two degrees centigrade (2° C.) per second. Since the bias will drift depending upon the length of time the gyroscope has been "powered up", the bias should be filtered out, as discussed below, by processing the data received from the gyroscope, preferably using a high pass filter.

In one embodiment, the display and sensors 403 are used to gather and display additional information, and to display the results of the in-path target determination. The display and sensors 403 may also activate collision avoidance systems, such as a warning chime, a driver override system, or the like. The sensors may include a speedometer, a velocimeter, an accelerometer, pitot tubes, or similar types of sensors for determining the speed of the host vehicle. The display may comprise a video display, an audio output, such as a tone, or similar output drawing attention to the fact that an obstacle is in the path of the host vehicle.

Figure 5:
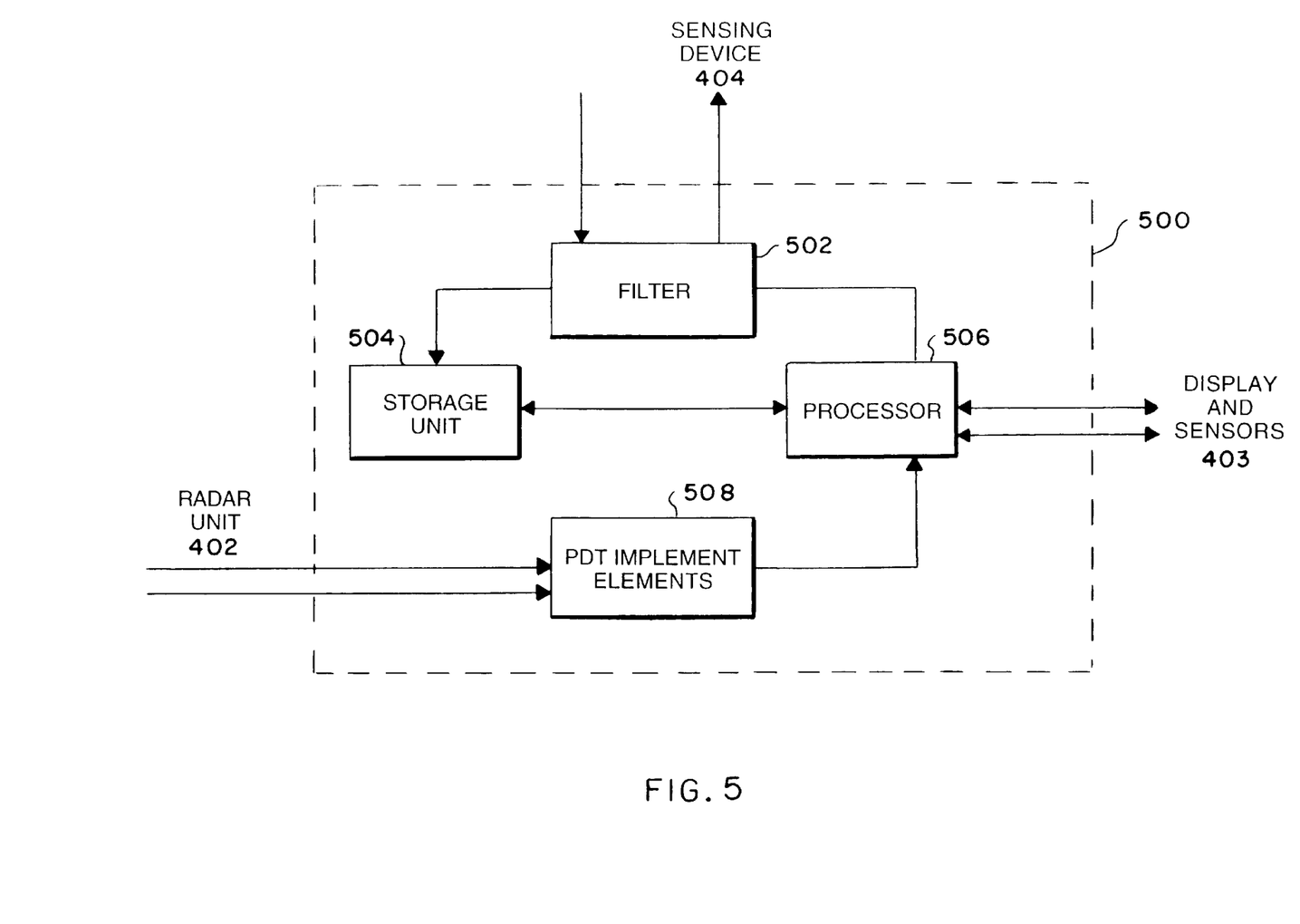
FIG. 5 is a simplified block diagram of one embodiment of processing circuitry in accordance with one embodiment of the present invention.

FIG. 5 illustrates a filter 502 included in one embodiment of the inventive circuitry 500 and used to filter 502 the sensing device 404 input. In the preferred embodiment, the filter eliminates, amongst other things, in-path target determination data for any object which is moving towards the host vehicle 111, such as cars moving in the opposite direction of travel. However, in an alternative embodiment objects moving in the opposite direction will be detected. In the preferred embodiment, the circuitry 500 is a processor 506. In another embodiment, the circuitry 500 includes the processor 506, a storage unit 504, and commonly known elements 508 needed for implementing the IOD unit 112. The circuitry 500 couples the radar unit 402, the sensing device 404, and the display and sensors 403. The circuitry 500 may transfer, store, send, or receive data and commands, depending upon its composition. In another embodiment, the circuitry 500 includes interfaces which allow the various hardware devices to cooperate in transferring input data to the processor 506.

Overall Sequence of Operation

Figure 6:
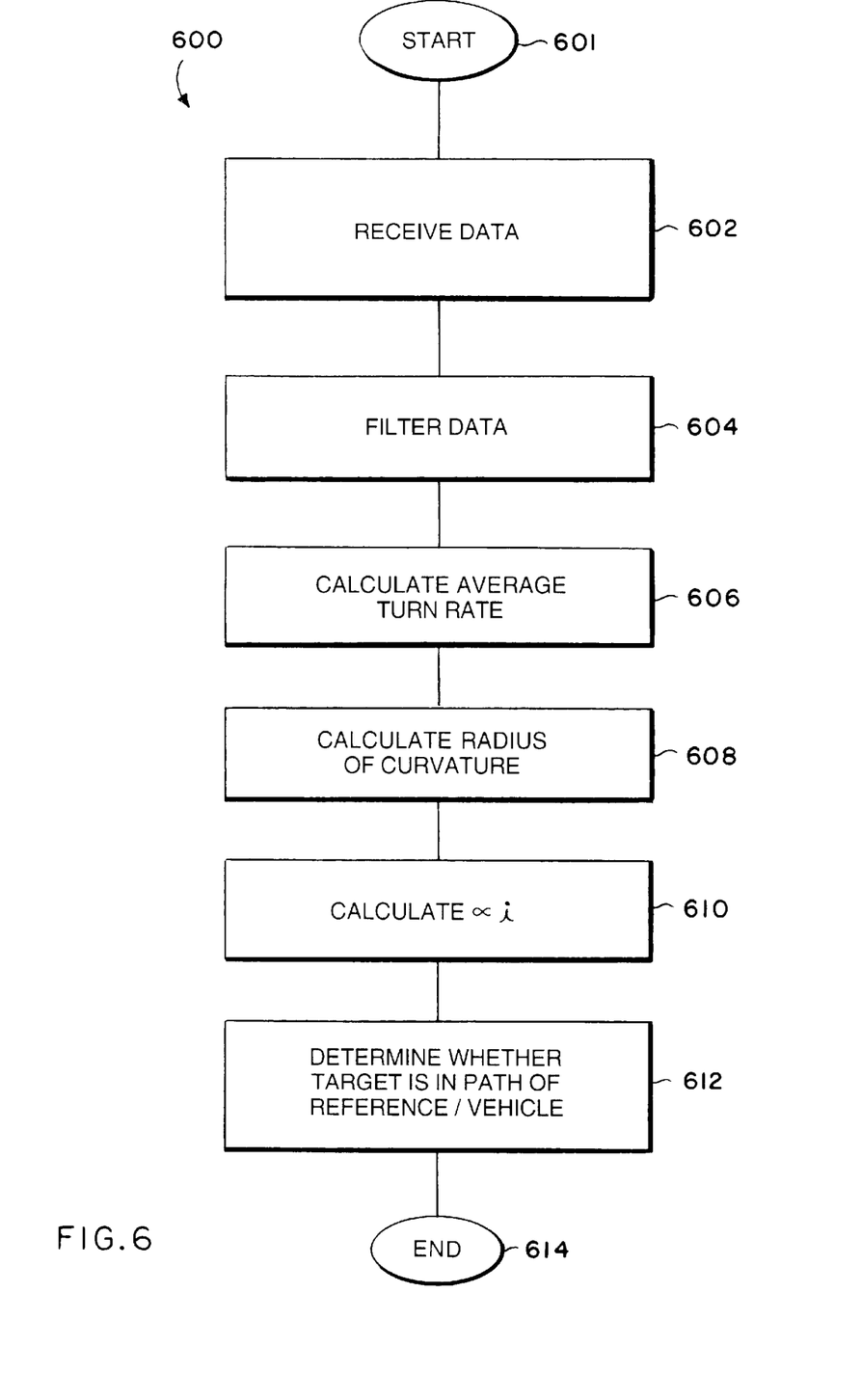
FIG. 6 is a flow chart of the method steps of one embodiment the present invention.

FIG. 6 shows a sequence of method steps 600 in accordance with one example of the present invention. For ease of explanation, but without any limitation intended thereby, the example of FIG. 6 is described in the context of the various embodiments of the invention described above. In one embodiment, the steps are initiated in task 601, and input data is received from the IOD unit 112 in step 602. The data from the IOD unit 112 may include information about the velocity of the host vehicle, the range of the host vehicle from the obstacle vehicle, and the deviation of the obstacle vehicle from the azimuth of the host vehicle. Various methods to gather and calculate this information are discussed in the patents incorporated by reference. Additionally, at least some information may be received from the host vehicle's own measuring equipment, such as a the velocity measuring devices mentioned above.

In task 604, the data received from the sensing device 404 of the IOD unit 112 is preferably filtered prior to any manipulation of the data in order to standardize the data received. For example, in one embodiment, the sensing device 404 is a gyroscope. Because the gyroscope bias drift varies depending upon the elapsed time over which the gyroscope has been "powered up", the bias should be filtered out by processing the data received from the gyroscope using the filter 502 shown in FIG. 5, as discussed above. In the one embodiment, the filter 502 processes the data output from the gyroscope using a discrete formulation for high pass filtering. The high pass filter output sequences equal:

$$y_n = \exp(-T/\tau) * y_{n-1} + (1 - 1/\tau) * x_n - \exp(-T/\tau) * x_{n-1}$$

where T is the sampling interval, $\tau$ is a constant related to the filter corner frequency, $x_n$ represents the gyro input sequences, $y_n$ represents the filter output sequences.

Preferably, every fifteen filter sequences are averaged to obtain four measurements of the host vehicle's 111 turn rate per second. This filtering is done to smooth out the effects of random fluctuations brought about by vibrations of the host vehicle 111 traveling along a non-uniform surface and by noise internal to the gyroscope. A smaller or greater number of filter sequences may be averaged and accuracy maintained depending upon the surface upon the amplitude and uniformity of the random fluctuations experienced by the IOD unit 112. If the desired data rate is small, for example, a few samples per second, even a low pass filter can be used.

In task 606, the average turn rate for the host vehicle 111 is calculated by the processor 506 of the circuitry 500 in the preferred embodiment of the invention. Although various methods may be used to calculate the average turn rate, it is preferred that the average turn rate $\omega_{av}$ be formed as:

$$\omega_{av} = \left(\sum_{i=1}^{15} y_i\right) / 15$$

where $y_i$ is the high pass filter output sequence, and the measurement is converted to units or radians per second. However, any method may be used for determining the average turn rate, and the measurement may be expressed in any measurement unit.

In task 608, the radius of curvature $R_{turn}$ of the path being traveled by the host vehicle 111 is determined. Preferably, the radius of curvature is calculated by the processor 506 as:

$$R_{turn} = V / \omega_{av}$$

where V is the speed of the host vehicle 111 measured in feet per second. Although one method is shown in which the radius of curvature may be calculated, any method may be used for determining the radius, and the measurement may be expressed in any measurement unit.

For every obstacle tracked by the radar of the current invention, an obstacle azimuth angle $_i$ is calculated in the preferred embodiment in task 610 by the processor 506. The angle $_i$ is used to determine whether a given obstacle is in the path of the host vehicle. Preferably, $_i$ is calculated as:

$$_i = 32 R_i / (2 * R_{turn})$$

where $R_i$ is the range to the $i_{th}$ obstacle being tracked by the IOD unit 112.

In task 612, the processor 506 determines whether or not an obstacle vehicle is in the path of host vehicle 111. The obstacle azimuth angle $_i$ is determined and then compared to the reference azimuth angle $\Psi$. Assuming N number targets are being tracked by the IOD unit 112, an obstacle vehicle is most likely in the path of the host vehicle in the preferred embodiment if the processor 506 determines that $_i$ equals $\Psi_i$, where i=1, 2, 3, ... N. In another embodiment, the obstacle vehicle is most likely to be in the path of the host vehicle if the processor 506 determines that $|\Psi_i - _i| < \epsilon$, where i=1, 2, 3, ... N, and $\epsilon$ is a constant. In the preferred embodiment, $\epsilon$ is equal to 0.4 degrees. In an alternate embodiment, the constant e is selected by the processor 506 to accommodate errors in the IOD unit's 112 azimuth output, speedometer output, turn rate measurements, and other errors based upon the specific application of the invention.

In task 612, if more than one obstacle satisfies the above inequality condition, than the processor 506 prioritizes the obstacle with the smallest range $R_i$ to be of primary interest. As would be obvious to one skilled in the art, if the host vehicle 111 were traveling along a curved path of travel, only the obstacle vehicle located on the side of the boresight nearest the obstacle vehicle need to be considered. For a path of large radius, the obstacle azimuth angle $_i$ takes on a value near zero so that, as expected for straight line travel, the only targets which are considered for in-path determination are those on or close to the boresight. The method ends in task 614.

Figure 7:
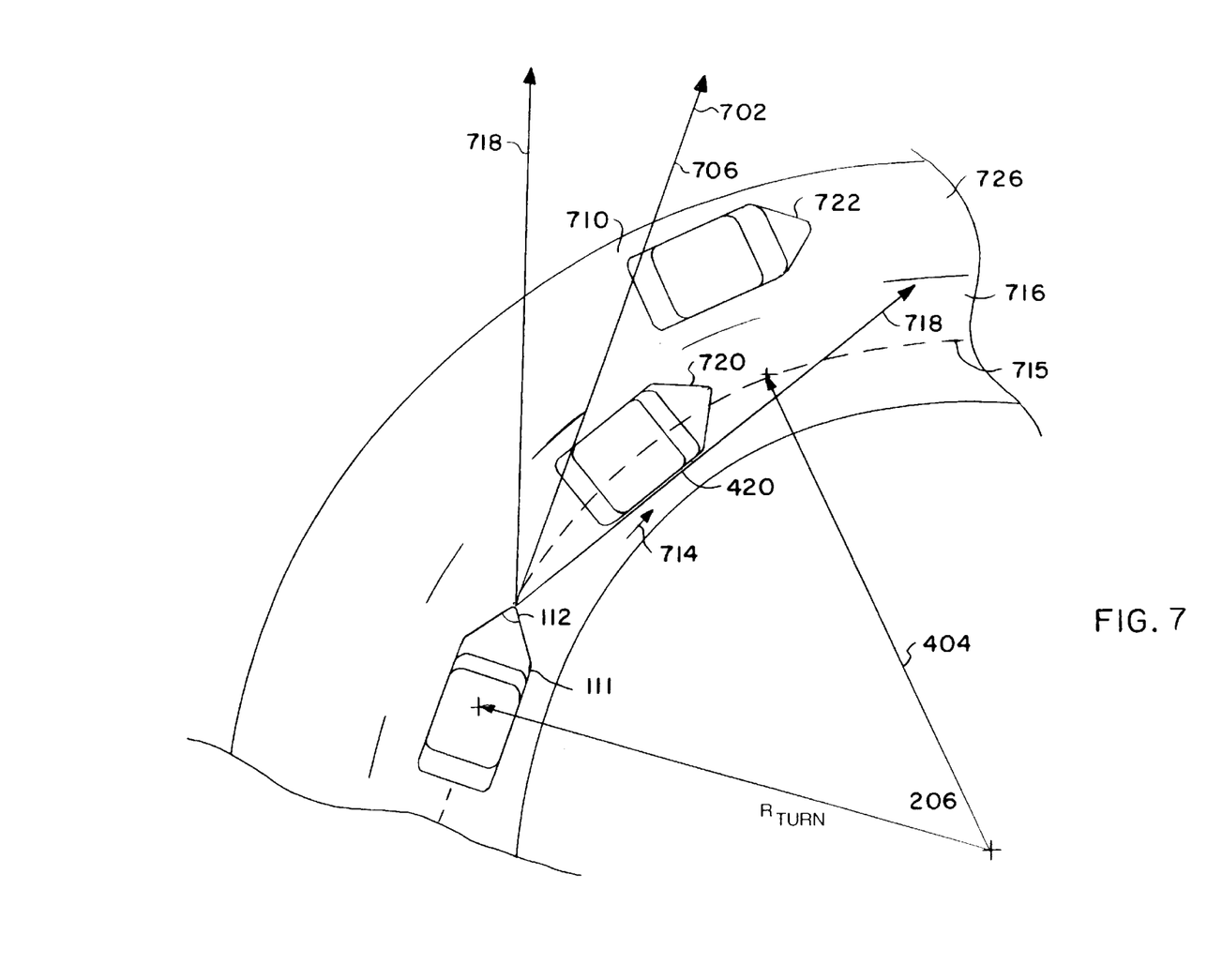
FIG. 7 is a plan view of a curved section of roadway showing an obstacle in the path of a host vehicle.

For example, FIG. 7 shows a first obstacle vehicle (FOV) 720 that is in a path 715 of the host vehicle 111. The host vehicle 111 is traveling in a direction shown by an arrow 714 in a lane 716 of a roadway 710. The IOD unit 112 of the host vehicle 111 transmits a radar beam 718 extending from the front end of the host vehicle 111. The radar beam 718 is shown as encompassing the FOV 720 and a second obstacle vehicle (SOV) 722. The FOV 720 and the SOV 722 are moving in the same direction as the host vehicle 111, as also represented by an the arrow 714.

The FOV 720 is "seen" by the radar beam 718 as being in the path of the host vehicle 111 because the deviation angle 704 (the angle between the reference azimuth 702 and the azimuth 706 calculated by the processor 506) is zero. However, the radar beam 718 would also "see" the SOV 722 as being in the path of the host vehicle 111 for the same reason. To determine whether or not the FOV 720 is truly in the path 715 of the host vehicle 111, the processor 506 calculates angle using the IOD unit's 112 input data as described above. The angle is compared to the angle $\Psi$ by the processor 506 and the in-path determination is completed. In the preferred embodiment, would be equal to $\Psi$ for the FOV 720, and $\neq \Psi$ for the SOV 722. Accordingly, the processor 506 would determine that the FOV 720 is in the path of travel 715 of host vehicle 111, but that the SOV 722 is not in the path of travel 715. The SOV 722 would be judged not in the path of the host vehicle 111 regardless of SOV 722's direction of travel.

Although the processor 506 performs the calculations and makes the in-path determinations in the preferred example stated above, the processor 506 does not have to be dedicated. The processor 506 may also perform other functions not directly related to making an in-path obstacle determination. Moreover, the calculating and interfacing steps may be performed by other devices contained in the circuitry 500. In another embodiment the processor may be reprogrammable.

Data Storage Device

Such a method as described above may be implemented, for example, by operating the IOD unit 112 to execute a sequence of machine-readable instructions. These instructions reside in various types of data storage medium. In this respect, one aspect of the present invention concerns an article of manufacture, comprising a data storage medium tangibly embodying a program of machine-readable instructions executable by the digital data processor 506 to perform the above method steps to make the in-path determination.

Figure 8:
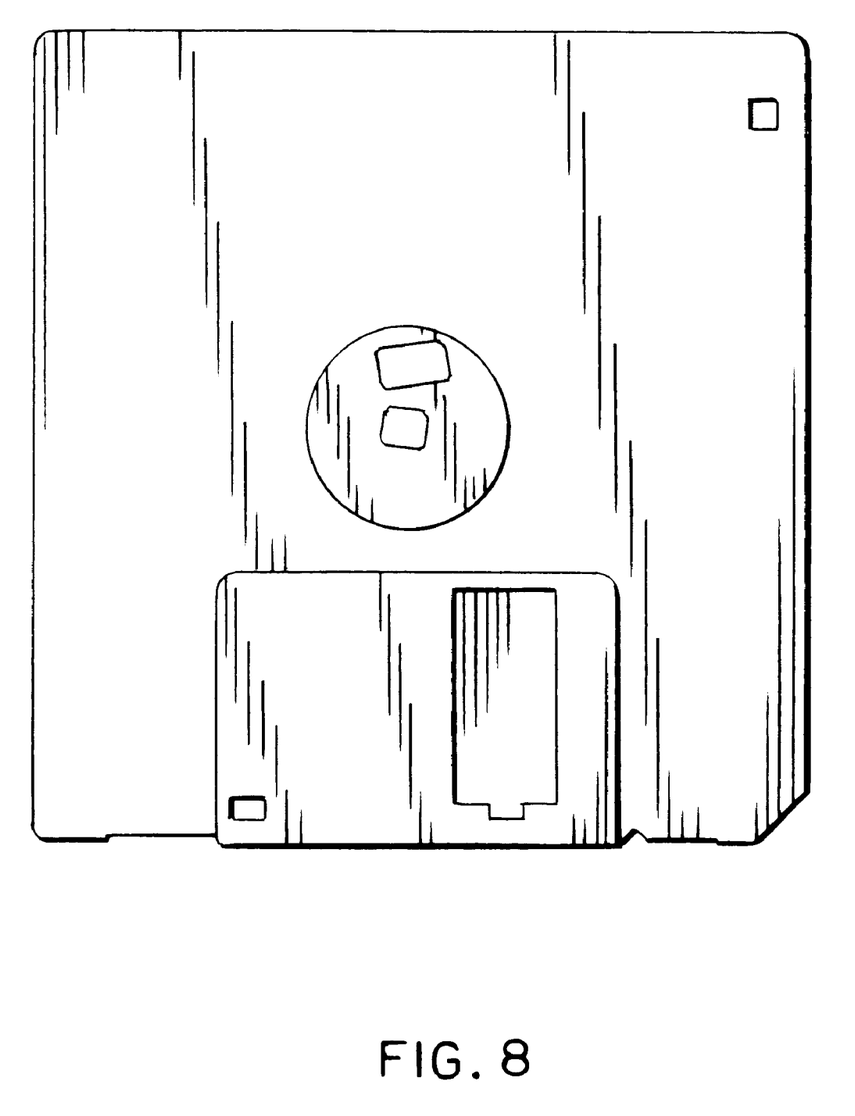
FIG. 8 is an exemplary illustration of a data storage device tangibly embodying a program of machine-readable instructions executable by a digital data processing apparatus used in accordance with the present invention.

This data storage medium may comprise, for example, RAM contained in storage unit 504 of the IOD unit 112. Alternatively, the instructions may be contained in another data storage medium, such as a magnetic data storage diskette 802 (FIG. 8). Whether contained in the IOD unit 112 or elsewhere, the instructions may instead be stored on another type of data storage medium, such as a direct access storage device (e.g., a conventional type "hard drive"), magnetic tape, electronic read-only memory (e.g., CD-ROM or WORM), an optical storage device (e.g., WORM), or other data storage media. In an illustrative embodiment of the invention, the machine-readable instructions may comprise, for example, lines of compiled C++ language code.

OTHER EMBODIMENTS

While there have been shown what are presently considered to be preferred embodiments of the invention, it will be apparent to those skilled in the art that various changes and modifications can be made herein without departing from the scope of the invention as defined by the appended claims. Accordingly, it is to be understood that the invention is not to be limited by the specific illustrated embodiment, but only by the scope of the appended claims.

What is claimed is:

1. An in path-obstacle determination device comprising:
   (a) an input device through which a deviation of an obstacle from a reference azimuth may be determined;
   (b) a sensing device through which an average turn rate, a rate of travel, and a radius of curvature of a path traveled by a host vehicle may be determined; and
   (c) circuitry coupled to the input device and the sensing device, and configured to determine whether the obstacle is in the path of travel of the host vehicle.

2. The device recited in claim 1, where the circuitry includes a processor.

3. The device recited in claim 1, where the sensing device is a gyroscope.

4. The device recited in claim 2, where the circuitry includes a storage unit.

5. The device in claim 3, where the circuitry includes a filter used to filter the output from the gyroscope.

6. The device recited in claim 5, where the filter uses a discrete formulation where $Y_n = \exp(-T/\tau) * Y_{n-1} + (1 - 1/\tau) * X_n - \exp(-T/\tau) * X_{n-1}$, where T is a sampling interval, $\tau$ is a constant related to a filter corner frequency, $X_n$ represents gyroscope input sequences with 2.5 volt bias removed, and $Y_n$ represents a filter output sequence.

7. The device recited in claim 6, wherein the average turn rate is determined as $$\omega_{av} = \left(\sum_{i=1}^{\eta} Y_i\right) / \eta,$$

where $\eta$ is the total number of samples used to determine the average turn rate, and $Y_i$ is the filter output for each sample.

8. The device recited in claim 7, wherein the radius of curvature is determined as $R_{turn} = V/\omega_{av}$, where V is a rate of travel of the host vehicle.

9. The device recited in claim 8, wherein determining whether the obstacle is in the path traveled by the host vehicle comprises:
   (a) calculating an angle $\psi_i$, where $\psi_i = R_i/(2 * R_{turn})$, where $R_i$ is the range to an $i^{th}$ obstacle;
   (b) comparing $\psi_i$ with $\Psi$, where $\Psi$ is a deviation of the obstacle at a given time from a reference azimuth; and
   (c) determining whether the obstacle is in the path of the host vehicle based upon the comparison of $\Psi$ to $\psi_i$.

10. The device recited in claim 8, wherein determining whether the obstacle is in a path of the host vehicle comprises:
    (a) calculating an angle $\psi_i$, where $\psi_i = R_i/(2 * R_{turn})$, where $R_i$ is the range to an $i^{th}$ obstacle;
    (b) calculating a obstacle cross-range $R_{ci}$, where $R_{ci}$ is the cross-range to an $i^{th}$ obstacle, and where $R_{ci} = R_i * (\Psi_i - \psi_i)$ where $\Psi$ is the deviation of a obstacle at a given time from the reference azimuth; and
    (c) determining whether the obstacle is in the path of the host vehicle by comparing $R_{ci}$ to L, where L equals one-half the width of the path traveled by the host vehicle.

11. The device in claim 10, where the obstacle is in the path of the host vehicle if $|R_{ci}| \leq L$.

12. The device recited in claim 9, where the obstacle is in the path of the host vehicle if $\Psi_i = \psi_i$, where i equals the total number of obstacles from 1 to $\eta$.

13. The device recited in claim 9, where the obstacle is in the path of the host vehicle if $|\Psi_i - \psi_i| < \epsilon$ where i equals the total number of obstacles from 1 to $\eta$ and $\epsilon$ is a constant.

14. The device recited in claim 12, where the obstacle with the lowest value for $R_i$ will be prioritized if $|\Psi_i - \psi_i| < \epsilon$ is satisfied for more than one of the obstacles from 1 to $\eta$.

15. An in-path obstacle determination device comprising;
    (a) an input device through which a deviation of an obstacle from a reference azimuth may be determined;
    (b) a gyroscope having an output and coupled to a host vehicle, wherein the gyroscope is used to determine an average turn rate, a rate of travel, and a radius of curvature for the host vehicle;
    (c) a processor; and
    (d) circuitry connecting the input device, the gyroscope, and the processor.

16. The device recited in claim 15, including a gyroscope output filter connected to the circuitry.

17. The device recited in claim 16, where the filter controls initial gyro bias using a discrete formulation where $Y_n = \exp(-T/\tau) * Y_{n-1} + (1 - 1/\tau) * X_n - \exp(-T/\tau) * X_{n-1}$, where T is the sampling interval, $\tau$ is a constant related to the filter corner frequency, $X_n$ represents a gyroscope input sequence with 2.5 volts removed, and $Y_n$ represents a filter output sequence.

18. The device cited in claim 16, wherein the radius of curvature is determined as $R_{turn}=V/\omega_{av}$, where V is a rate of travel of the host vehicle.

19. The device cited in claim 18, including determining whether the obstacle is in a path of the host vehicle, comprising:
   (a) calculating an angle $\Omega_i$, where $\Omega_i = R_i/(2*R_{turn})$, where $R_i$ is the range to an $i^{th}$ obstacle;
   (b) comparing $\Omega_i$ with $\Psi$, where $\Psi$ is a deviation of the obstacle at a given time from a reference azimuth; and
   (c) determining that the obstacle is in the path of the host vehicle by comparing $\Psi$ to $\Omega_i$.

20. The device cited in claim 19, where the obstacle is in the path of the host vehicle if $\Psi_i = \Omega_i$, where i equals the number of obstacles from 1 to $\eta$.

21. The device cited in claim 19, where the obstacle is in the path of the host vehicle if $|\Psi_i - \Omega_i| < \epsilon$ where i equals the total number of obstacles from 1 to $\eta$ and $\epsilon$ is a constant.

22. The device cited in claim 21, where the obstacle with the smallest value for $R_i$ will be prioritized if $|\Psi_i - \Omega_i| < \epsilon$ is satisfied for more than one obstacle from 1 to $\eta$.

23. The method recited in claim 22, wherein the turn input is received from a gyroscope, and the initial bias of the gyroscope is determined as $$G_{IB} = \sum_{\substack{i=1 \\ 2^6}}^{\eta} G_i$$

where $G_i$ is the sample reading at times one through $\eta$.

24. The method recited in claim 23 including the step of storing turn input for a period of time when the host vehicle is stationary, and using the stored turn input to determine the initial bias of the gyroscope.

25. The method recited in claim 23, wherein the period of time includes four integrals, each measured from the time turn input is first generated, the integrals comprising:
   (a) 0–2 minutes;
   (b) 2–5 minutes;
   (c) 5–10 minutes; and
   (d) 10+ minutes.

26. The method recited in claim 23, wherein $G_i$ is taken every 20 $\mu$sec and $\eta$ equals 64.

27. An in-path obstacle determination device comprising:
   (a) input means for determining a deviation of a obstacle from a reference azimuth;
   (b) sensing means for determining a turn rate, a rate of travel, and a radius of curvature for a host vehicle; and
   (c) circuitry means for coupling the input means and the sensing means, and configured to determine whether the obstacle is in a path of travel of the host vehicle.

28. A method for in-path obstacle determination, comprising the steps of:
   (a) receiving an input through which a deviation of a obstacle from a reference azimuth may be determined;
   (b) receiving a turn input for a host vehicle from which an average turn rate, a rate of travel, and a radius of curvature for the path traveled by a host vehicle may be determined;
   (c) calculating the average turn rate;
   (d) determining the rate of travel of the host vehicle;
   (e) calculating the radius of curvature for the path traveled;
   (f) determining a range from the host vehicle to each obstacle;
   (g) determining a deviation of each obstacle from the reference azimuth;
   (h) calculating an angle $\Omega_i$; and
   (i) determining whether the obstacle is in a path of the host vehicle using the angle $\Omega_i$.

29. The method recited in claim 28, wherein determining whether the obstacle is in the path of the host vehicle includes calculating a cross-range to the obstacle using the angle $\Omega_i$.

30. The method recited in claim 28 including the step of filtering the turn input to eliminate any initial bias inherent in any instrument used to measure the turn input.

31. The method recited in claim 30, wherein the turn input is received from a gyroscope, and the initial bias of the gyroscope is determined as $$G_{IB} = \sum_{\substack{i=1 \\ 2^6}}^{\eta} G_i$$

where $G_i$ is the sample reading at times one through $\eta$.

32. The method recited in claim 30, including the step of storing turn input for a period of time when the host vehicle is stationary, and using the stored turn input to determine the initial bias of the gyroscope.

33. The method recited in claim 30, wherein the time period includes four integrals each measured from the time turn input is first generated, the integrals comprising:
   (a) 0–2 minutes;
   (b) 2–5 minutes;
   (c) 5–10 minutes; and
   (d) 10+ minutes.

34. The method recited in claim 30, wherein $G_i$ is taken every 20 $\mu$sec and $\eta$ equals 64.

35. An article of manufacture comprising a data storage medium tangibly embodying a program of machine-readable instructions executable by a digital processing apparatus to perform method steps for in-path obstacle determination, said method steps comprising:
   (a) receiving an input through which a deviation of a obstacle from a reference azimuth may be determined;
   (b) receiving a turn input for a host vehicle from which an average turn rate, a rate of travel, and a radius of curvature for the path traveled by a host vehicle may be determined;
   (c) calculating the average turn rate;
   (d) determining the rate of travel of the host vehicle;
   (e) calculating the radius of curvature for the path traveled;
   (f) determining a range from the host vehicle to each obstacle;
   (g) determining a deviation of each obstacle from the reference azimuth;
   (h) calculating an angle $\Omega_i$; and
   (i) determining whether the obstacle is in a path of the host vehicle using the angle $\Omega_i$.

36. The article of manufacture recited in claim 35, including the step of filtering the turn input to eliminate initial bias inherent in any instrument used to measure the turn input.

37. The article of manufacture recited in claim 35, including the step of storing turn input for a period of time when the host vehicle is stationary, and using the stored turn input to determine the initial bias of the gyroscope.

38. The article of manufacture recited in claim 37, wherein the time period includes four integrals, each measured from the time turn input is first generated, the integrals comprising:

(a) 0–2 minutes;
(b) 2–5 minutes;
(c) 5–10 minutes; and
(d) 10+ minutes.

UNITED STATES PATENT AND TRADEMARK OFFICE
CERTIFICATE OF CORRECTION

PATENT NO. : Yaswant K. Ameen
DATED : 5,959,569
INVENTOR(S) : September 28, 1999

It is certified that error appears in the above-indentified patent and that said Letters Patent is hereby corrected as shown below:

On the front page, the inventor's name reads "Yashwant Khodabhai" and should read --Yashwant K. Ameen--.

Signed and Sealed this

Seventeenth Day of April, 2001

Attest:

NICHOLAS P. GODICI

*Attesting Officer*  *Acting Director of the United States Patent and Trademark Office*